REDUNDANT DIGITAL DATA STORAGE SYSTEM

Original Filed July 28, 1958

INVENTOR
GERHARD DIRKS
BY Joseph Weingarten
ATTORNEY

REDUNDANT DIGITAL DATA STORAGE SYSTEM

Original Filed July 28, 1958

INVENTOR
GERHARD DIRKS
BY Joseph Weingarten
ATTORNEY

United States Patent Office 3,281,804

Patented Oct. 25, 1966

3,281,804
REDUNDANT DIGITAL DATA STORAGE SYSTEM

Gerhard Dirks, 12120 Edgecliff Place, Los Altos Hills, Calif.

Continuation of application Ser. No. 751,307, July 28, 1958. This application Aug. 3, 1961, Ser. No. 130,454
Claims priority, application Great Britain, Aug. 6, 1957, 24,771/57
10 Claims. (Cl. 340—174.1)

This application is a continuation application of pending patent application Serial No. 751,307, filed July 28, 1958 entitled "Digital Data Storage" and now abandoned.

This invention relates to a method and apparatus for producing an information bearing record in a form which allows the accuracy of the information recorded thereon to be checked, and to apparatus for reading information recorded on such an information bearing record.

It is known to record information, for example on a magnetic tape or a punched tape or card, in such a way that the accuracy of the recorded information may be checked. In one arrangement, each character to be recorded is coded in such a way that it is represented by an odd number of code elements. As such recorded characters are sensed the number of code elements in each character is counted to determine whether the number is odd or even. If the count is even then it indicates that an error has been made in recording, or sensing, that character. It will be apparent that if the number of code elements in a character is increased or decreased by two or a multiple thereof, then the checking arrangement will not indicate an error.

It is an object of the invention to provide an improved method of producing an information bearing record, which has information recorded thereon in such a way that when the information is sensed the accuracy of the sensing and of the original recording may be checked.

It is a further object of the invention to provide apparatus for recording information signals and checking signals related thereto on separate areas of an information bearing medium.

It is a further object of the invention to provide apparatus for sensing information signals and checking signals related thereto, which signals are recorded on an information bearing record, and for utilizing such signals to check the accuracy of the sensed information. The information and checking signals may be combined to generate a clock pulse train.

According to one feature of the invention, apparatus for checking the accuracy of reproduction of data represented by signals recorded on a record medium, the data being recorded in one form in one channel and in an inverse form in a second channel, includes transducing means for each channel adapted to generate trains of electrical signals corresponding to the recorded signals in the two channels and means adapted to compare the trains of electrical signals and to generate an error signal in response to electrical signals representing the occurrence of recorded signals in similar positions in both channels.

According to another feature of the invention, apparatus for checking the accuracy of reproduction of data items represented by signals recorded on a record medium, the data being recorded in one form in one channel and in an inverse form in a second channel, includes transducing means for each channel adapted to generate trains of electrical signals corresponding to signals recorded in the two channels, means adapted to compare the trains of electrical signals and to generate an error signal in response to electrical signals representing the occurrence of recorded signals in similar positions in both channels and counting means adapted to count the electrical signals corresponding to each data item and to generate an error signal in response to a data item count different from a predetermined count.

According to a further feature of the invention, apparatus for checking the accuracy of reproduction of data items represented by signals on a record medium, in which the record medium is provided with a plurality of pairs of signal recording areas arranged sequentially to form first and second signal tracks, the data being so recorded that only one area of each pair of areas contains signals of a particular kind, includes transducing means for each track adapted to generate electrical signals corresponding to the signals recorded in that track, means adapted to compare the trains of signals and to generate a first error signal in response to the occurrence of signals from both areas of a pair, and means adapted to count the signals in both trains for each data item and to generate a second error signal in response to a data item count different from a predetermined count.

The invention will now be described, by way of example, with reference to the accompanying drawing, in which.

Figures 1, 2, 3:
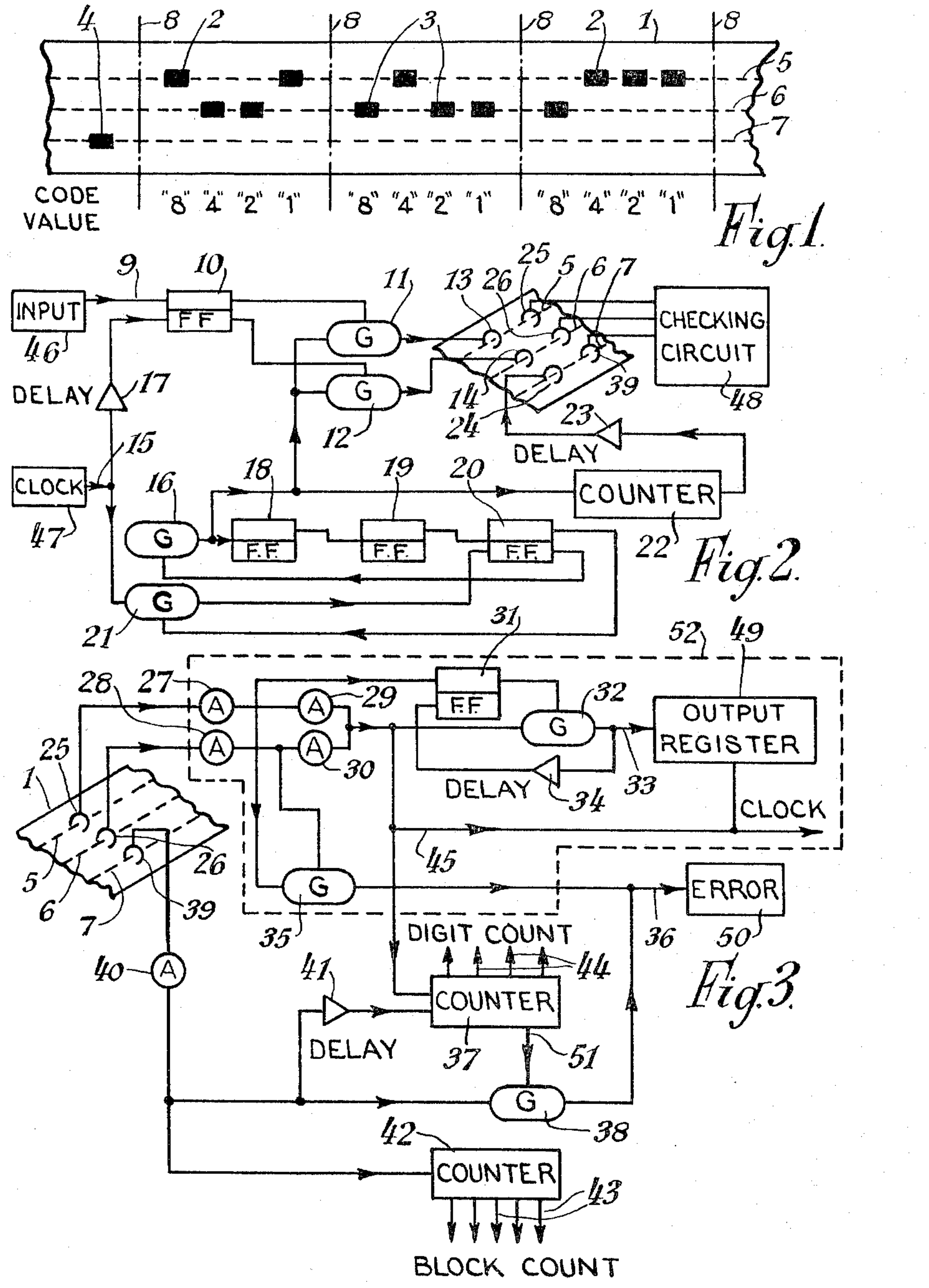
FIG. 1 illustrates an information bearing tape.
FIG. 2 is a schematic diagram of an arrangement for recording information on a magnetic tape.
FIG. 3 is a schematic circuit diagram of an information sensing and checking arrangement for use with magnetic tape.

FIGURE 1 shows part of a magnetic tape 1 on which recorded signals 2, 3 and 4 are indicated schematically by black areas. The signals 2, 3 and 4 are recorded in separate tracks or channels 5, 6 and 7 respectively. One decimal digit is recorded in each area of the tape bounded by a pair of chain dotted lines 8. The value of each recorded digit is represented by the signals 2, in the track 5, in accordance with a binary-decimal code as indicated below the lower edge of the tape. The checking signals 3 in the track 6 occur in those code positions which are not occupied by signals in the track 5. The right hand digit area, as seen in FIG. 1, records the value "7" as represented by signals 2 in the code positions "1," "2" and "4." Accordingly, the track 6 contains a signal 3 in the "8" code position. Similarly the next digit area records the value "4," so that signals 3 are recorded in the code positions "1," "2" and "8" of track 6. Thus the checking track 6 may be regarded as recording the inverse form of the value recorded in the data track 5.

Since every code position which is not occupied by a signal 2 is occupied by a signal 3, the sum of the signals in the two tracks 5 and 6 is always equal to four in each digit area. If such a record is sensed and the sensed signals from both the tracks 5 and 6 are counted, either for each digit or for a block of digits, the total count will indicate whether any signals are missing due to error in either recording or sensing. By also testing for the simultaneous occurrence of signals from both the tracks 5 and 6, a check is made that no spurious signals have been recorded or sensed. Thus the accuracy of information sensed from such a record may readily be checked. The combined signals from the tracks 5 and 6 may also be used to provide a source of clock pulses for control purposes.

The information may be recorded in other codes such as "excess 3" for decimal digits, or a seven element code for alphabetical characters and digits. Alternatively non-combinational codes may be used. For example, a decimal digit may be represented by a signal in the track 5 in that position out of ten possible positions which corresponds to the required digit value, signals in the remaining nine positions being recorded in the track 6. Thus, to record the digit "7" in a digit area of the tape a signal would be recorded in track 5 in the seventh position and signals would be recorded in the track 6 in the first to sixth and eighth to tenth positions.

To simplify handling of information signals sensed from the tape, the signals in each digit area are separated from those in adjacent areas by a distance equal to that occupied by the recording of one code position. In addition each block of digit recordings is followed by the signal 4 in the track 7 which acts as a "block end" marker signal. The block end may also be indicated by a larger gap, so that only two tracks are required.

FIG. 2 shows in schematic form a circuit for producing a magnetic tape record of the form shown in FIG. 1. A serial train of pulses representing the information to be recorded is applied from an input source 46 over a line 9 to a flip-flop 10. This input pulse train consists of a pulse for each code position required to represent the information. For example, the digit "7" would be represented by three pulses in succession representing the code positions "1," "2" and "4," followed by a blank period corresponding to the code position "8," and a further blank position corresponding to the gap between adjacent digits. The two anodes of the flip-flop 10 control gates 11 and 12 respectively, and the outputs of those gates are fed to magnetic recording heads 13 and 14. The heads 13 and 14 record signals in the tracks 5 and 6, respectively, of the tape 1.

The input line 9 is connected to one grid of the flip-flop 10 so that a pulse occurring on this line switches on the flip-flop. When the flip-flop 10 is on, the anode voltages are such that the gate 11 is open and the gate 12 is closed. Clock pulses from a source 47 are fed to the inputs of the gates 11 and 12 via a line 15 and a gate 16. These clock pulses are synchronized with the input pulses on the line 9 and the gate 16 is used to eliminate every fifth pulse to produce the gap between adjacent digit area recordings.

When the gate 11 is opened as a result of the occurrence of a pulse on the line 9, it will pass a clock pulse from the gate 16 and the head 13 will be energized to record a signal in the track 5. The same clock pulse will pass through a delay network 17 to the other grid of the flip-flop 10, to switch it off immediately after the signal has been recorded on the tape 1 and thus prepare the flip-flop for operation by the next input pulse on the line 9. If no pulse occurs on the line 9 corresponding to the next code position, then the flip-flop 10 will be off when the next clock pulse occurs. Hence, the gate 11 will be closed and the gate 12 will be open, so that the clock pulse from the gate 16 will be fed to the head 14 to record a signal in the track 6. Thus a signal is recorded on the tape 1 for each clock pulse passed by the gate 16, this pulse being recorded in the track 5 if a corresponding input pulse has occurred on the line 9 and in the track 6 if there is no such corresponding pulse.

The pulses from the gate 16 are also fed to a chain of three flip-flops 18, 19 and 20 which together form a scale of five counter. The pulses are applied to both grids of the flip-flop 18 to switch it on and off alternately. Each time the flip-flop 18 is switched off it applies a pulse to the flip-flop 19. Each time the flip-flop 19 switches off it applies a pulse to the flip-flop 20. In the initial state the three flip-flops are all off, so that after four pulses have been passed by the gate 16 the flip-flops 18 and 19 are off and the flip-flop 20 is on. One anode of the flip-flop 20 is connected to the gate 16 and holds the gate open as long as the flip-flop is off. The other anode of the flip-flop 20 controls a gate 21 to open the gate when said flip-flop is on. Hence, the fifth clock pulse is not passed by the gate 16, but it is passed by the gate 21, and is applied to one grid of the flip-flop 20 to switch it off. Hence the counting flip-flops have now been returned to their initial condition ready for a new cycle of operation, and a gap has been produced on the tape after the last digit recording since the tape is fed at uniform speed past the recording heads and neither head was energized for one clock pulse period. The pulses from the gate 16 are also fed to a counter 22, which has a counting capacity equal to four times the number of digits in a block. For example, if there are ten digits to a block then the counter has a capacity of forty and it will produce a carry pulse at the end of each block of ten digits. This pulse is fed through a delay network 23 to a recording head 24 to record a block end marker signal in the track 7. Alternatively the block end marker signal may be derived from the computer or other device which is generating the input signals and clock pulses.

It will be appreciated that the information may be recorded in other ways. For example, the signals from the gates 11 and 12, may be utilized to control punch operating magnets, so that a punched paper tape or a punched record card is produced with the punched holes arranged in two lines corresponding to the tracks 5 and 6 of the magnetic tape. Alternatively, the signals may control a device for printing marks on the record. The marks may be made with a magnetic or electrically conductive ink, for example, or with ordinary ink for photoelectric sensing. Such records may be prepared manually by providing visual indication of the position in which marks are to be made. By providing a corresponding number of recording devices the signals for all the code positions of a digit, or of several digits, may be recorded simultaneously. When the information is recorded on a sheet, such as a card or cheque, the tracks or channels need not be recorded in closely adjacent positions. However, close spacing of the tracks permits appreciable skewing of the tape during sensing without causing errors.

The information recorded by the heads 13 and 14 may be checked by reading heads 25 and 26, which are connected to a checking circuit 48. The heads 25 and 26 are spaced a short distance away from the heads 13 and 14, so that the information is sensed a short time after recording as the tape continues to be fed. The details of the checking circuit 48 are shown in FIG. 3. The tracks 5 and 6 are sensed by heads 25 and 26 which feed amplifiers 27 and 28. The amplifiers 27 and 28 feed amplifiers 29 and 30, the outputs of which are connected in common to a clock pulse output line 45. A pulse will appear on the line 45 corresponding to each code position of each of the digits sensed, since each code position has a recording in either the track 5 or the track 6, so that the clock pulse train may be used to synchronize the operation of a computer or other device to which the information sensed from the tape is fed.

The information signals sensed from the track 5 are also fed via the amplifier 27 to one grid of a flip-flop 31. Each time an information pulse occurs the flip-flop 31 is switched on. A gate 32 is controlled by the voltage of one anode of the flip-flop 31 so that the gate is open only when the flip-flop is on. The gate 32 also receives the clock pulse train produced by the amplifiers 29 and 30, so that a pulse is produced on a line 33, by the gate 32, each time the flip-flop 31 is switched on. The pulses on the line 33 are fed to the input of a shifting register 49, to which the clock pulses on line 45 are applied as shift pulses. Each output pulse is fed back through a delay network 34 to the other grid of the flip-flop 31 to switch it off, so that after each output pulse the flip-flop is reset ready for operation by the next information pulse from the amplifier 27. The information pulses are also fed to the input of a gate 35 which is controlled by the checking signal pulses produced by the amplifier 28. Hence, if a spurious signal has been recorded in either of the tracks 5 or 6, so that pulses are produced simultaneously by the amplifiers 27 and 28, then the gate 35 will be operated to produce an output pulse on an error line 36, to set an error indicator 50.

The clock pulse train produced by the amplifiers 29 and 30 is also fed to a counter 37. The counter 37 is used to control a gate 38 via line 51, the gate 38 being open except when the counter is registering the correct count for a block of digits. Block end marker signals are fed to the input of the gate 38 by a head 39, which senses the track 7, and an amplifier 40. Hence, unless the correct number of pulses have been counted by the counter 37 when a block end marker signal occurs, the gate 38 will produce an output pulse which is fed to the error line 36. Thus the absence of a pulse on the line 36 during the sensing of a block of digits on the tape 1 indicates that the correct number of signals have been sensed in the tracks 5 and 6 and also that two signals had not been sensed simultaneously in the tracks 5 and 6. The setting of the error indicator 50 may be used to stop the tape feed, or to reverse the tape feed for a distance equal to one block of digits to allow the block to be sensed a second time. An indicator lamp, or other warning device, may be operated by the occurrence of an error signal. Additionally, the state of the counter 37 may be checked during every digit gap. This is desirable when a block is transferred digit by digit to a printing mechanism, for example, rather than being transferred as a whole. Thus, it is preferable to check the count on the same basis of blocks, or sections of blocks, as that on which transfer takes place.

The counter 37 is reset to zero at the end of every block of digits by applying the block end marker pulse from the amplifier 40 to the counter through a delay network 41. The block end marker pulses are also fed to a counter 42. The value registered by the counter, as indicated by the potential of output lines 43 of the counter, provides an indication of which block of digits is being sensed, and the potential of these lines may control the selective transfer of a required block, or blocks, of digits from the tape. Output lines 44 from the counter 37 may be used to control selective transfer of particular digits of a block in the same way.

It will be appreciated that the sensing heads 25, 26 and 39 would be replaced by other suitable signal transducing means such as photo-electric cells, electric sensing brushes or other sensing devices when the circuit is used to sense information recorded in the form of marks, holes, etc.

The counters 22, 27 and 42 may conveniently be decimal counters of known form, utilizing a chain of flip-flops. One suitable form of counter is that described in British Patent Specification No. 672,321. Each of the counters 22, 37 and 42 consists of two decade units.

The delay circuit 23 (FIG. 2) is capacitatively coupled to an anode of the third counting stage of the second decade of counter 22, so that a pulse is fed to the delay circuit when this stage switches on, which occurs when the counter reaches forty.

The potential of the line 51 (FIG. 3) is determined by a diode AND gate. The AND gate has an input connected to one anode of each stage of the first decade of the counter and a further anode connected to one anode of the third stage of the second decade, so that the voltage at the output of the AND gate does not fall until the first decade is registering zero and the second decade is registering four. The output of the AND gate is connected to the line 51.

The flip-flops, such as 31, 18 and 10, are of the conventional cross-coupled type similar to those used in the counters. The gates 11, 12, etc. may conveniently be pentodes with the two inputs applied to the control and suppressor grids. A pulse transformer may be connected in the anode circuit to allow selection of the polarity of the output pulse.

It will be apparent that the sensing arrangement shown in FIG. 3 may be used for sensing any tape recorded in the manner described and that it is not necessarily associated with the recording arrangement shown in FIG. 2.

Figure 4:
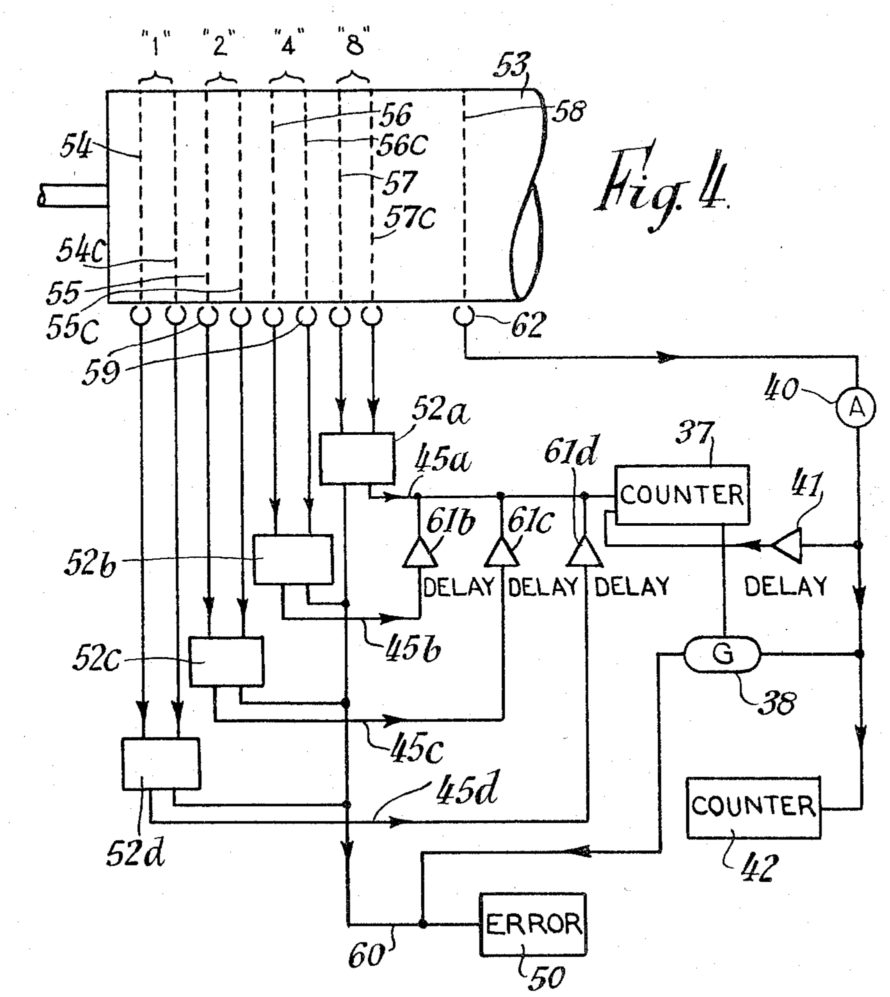
FIG. 4 is a schematic circuit diagram of an arrangement for information recorded in serial-parallel form.

FIG. 4 shows how the arrangement of FIG. 3 may be modified to deal with a serial-parallel recording of values on a magnetic storage drum 53. The digits are recorded serially, as in the case of the tape of FIG. 1, but the code elements of one digit are recorded in parallel, along the same axial line. Accordingly, a pair of tracks are provided for each code element. The digit-value signals are recorded in the tracks 54 to 57, and the checking signals are recorded in the tracks **54*c* to 57*c*. Thus, the digit value seven is represented by signals recorded in tracks 54, 55, 56 and 57*c***, all the signals lying on the same axial line.

It will be appreciated that the circuit shown in FIG. 3 could be provided for each pair of tracks, the capacity of the counter 37 being reduced to take account of the fact that a single signal only is produced for each digit. However, the arrangement of FIG. 4 provides a considerable economy in equipment over such an arrangement.

The heads 59 associated with each pair of tracks feed one of the units **52*a* to 52*d*. The detailed circuit of each unit is indicated by the dotted line 52 in FIG. 3. The outputs of the gates 35 in the units are fed in common via line 60 (FIG. 4) to the input of the error indicator 50**. Hence, the error indicator will be set if any of the units detects two pulses occurring simultaneously.

The clock pulse output from unit **52*a* is fed directly to the input of the couter 37. The clock pulse outputs from units 52*b*, 52*c* and 52*d*, however, are fed to counter 37 via lines 45*b*, 45*c* and 45*d* and delay circuits 61*b*, 61*c* and 61*d* respectively. The delays provided by these circuits are different so that the clock pulses are fed to the counter in sequence, although they are generated simultaneously. The longest delay, provided by circuit 61*d* is less than the interval between the sensing of successive digits. The delay circuits 61 and the other delay circuits, such as 17**, are preferably conventional lumped constant delay circuits.

Block end marker signals are sensed from a track 58 by a head 62 and are fed to the gate 38 and the counter 42 in the same manner as has already been described in connection with FIG. 3. Thus the gate 38 provides a signal to set the error indicator, as before, if the digit count registered by the counter 37 is incorrect.

What I claim is:

1. Apparatus for recording data on a recording medium in a form adapted for checking comprising, in combination, a first recording head positioned in operative proximity with said recording medium; a second recording head positioned in operative proximity with said recording medium in spaced relation to said first recording head; timing signal means for providing timing signals; a first gate having an input connected to said timing signal means, an output connected to said first recording head and conduction control means, said first gate being adapted to maintain under the control of said conduction control means one of an open condition in which said gate conducts a signal from the input to the output thereof and a closed condition in which said gate blocks a signal; a second gate having an input connected to said timing signal means, an output connected to said second recording head and conduction control means, said second gate being adapted to maintain under the control of said conduction control means one of an open condition in which said gate conducts a signal from the input to the output thereof and a closed condition in which said gate blocks a signal; data input means for providing data signals; and transfer control means connected between said data input means and the conduction control means of each of said first and second gates for controlling the condition of each of said first and second gates in accordance with said data signals.

2. Apparatus for recording data on a recording medium in a form adapted for checking comprising, in combination, a first recording head positioned in operative proximity with said recording medium; a second recording head positioned in operative proximity with said recording medium in spaced relation to said first recording head; timing signal means for providing timing signals; a first gate having an input connected to said timing signal means, an output connected to said first recording head and conduction control means, said first gate being adapted to maintain under the control of said conduction control means one of an open condition in which said gate conducts a signal from the input to the output thereof and a closed condition in which said gate blocks a signal; a second gate having an input connected to said timing signal means, an output connected to said second recording head and conduction control means, said second gate being adapted to maintain under the control of said conduction control means one of an open condition in which said gate conducts a signal from the input to the output thereof and a closed condition in which said gate blocks a signal; data input means for providing data signals; and transfer control means connected between said data input means and the conduction control means of each of said first and second gates for controlling the condition of each of said first and second gates in accordance with said data signals, said transfer control means comprising a bistable multivibrator adapted to be switched to one stable state by each of said data signals.

3. Apparatus for recording data on a recording medium in a form adapted for checking comprising, in combination, a first recording head positioned in operative proximity with said recording medium; a second recording head positioned in operative proximity with said recording medium in spaced relation to said first recording head; timing signal means for providing timing signals; a first gate having an input connected to said timing signal means, an output connected to said first recording head and conduction control means, said first gate being adapted to maintain under the control of said conduction control means one of an open condition in which said gate conducts a signal from the input to the output thereof and a closed condition in which said gate blocks a signal; a second gate having an input connected to said timing signal means, an output connected to said second recording head and conduction control means, said second gate being adapted to maintain under the control of said conduction control means one of an open condition in which said gate conducts a signal from the input to the output thereof and a closed condition in which said gate blocks a signal; data input means for providing data signals; and transfer control means connected between said data input means and the conduction control means of each of said first and second gates for controlling the condition of each of said first and second gates in accordance with said data signals, said transfer control means comprising a bistable multivibrator having a first input connected to said data input means, a first output connected to the conduction control means of said first gate, a second output connected to the conduction control means of said second gate so that each data signal provided by said data input means puts said first gate in its open condition thereby to conduct a timing signal to said first recording head and puts said second gates in its closed condition thereby to block a timing signal from said second recording head and when no data signal is provided by said data input means said first gate is put in its closed condition thereby to block a timing signal from said first recording head and puts said second gate in its open condition thereby to conduct a timing signal to said second recording head.

4. Apparatus for recording data on a recording medium in a form adapted for checking comprising, in combination, a first recording head positioned in operative proximity with said recording medium; a second recording head positioned in operative proximity with said recording medium in spaced relation to said first recording head; timing signal means for providing timing signals; a first gate having an input connected to said timing signal means, an output connected to said first recording head and conduction control means, said first gate being adapted to maintain under the control of said conduction control means one of an open condition in which said gate conducts a signal from the input to the output thereof and a closed condition in which said gate blocks a signal; a second gate having an input connected to said timing signal means, an output connected to said second recording head and conduction control means, said second gate being adapted to maintain under the control of said conduction control means one of an open condition in which said gate conducts a signal from the input to the output thereof and a closed condition in which said gate blocks a signal; data input means for providing data signals; and transfer control means connected between said data input means and the conduction control means of each of said first and second gates for controlling the condition of each of said first and second gates in accordance with said data signals, said transfer control means comprising a bistable multivibrator having a first input connected to said data input means, a first output connected to the conduction control means of said first gate, a second output connected to the conduction control means of said second gate so that each data signal provided by said data input means puts said first gate in its open condition thereby to conduct a timing signal to said first recording head and puts said second gate in its closed condition thereby to block a timing signal from said second recording head and when no data signal is provided by said data input means said first gate is put in its closed condition thereby to block a timing signal from said first recording head and puts said second gate in its open condition thereby to conduct a timing signal to said second recording head, and a second input connected to said timing signal means through time delay means so that said bistable multivibrator switches its stable state under the control of a timing signal after said first recording head receives a timing signal.

5. Apparatus for recording data on a recording medium in a form adapted for checking comprising, in combination, a first recording head positioned in operative proximity with said recording medium; a second recording head positioned in operative proximity with said recording medium in spaced relation to said first recording head; timing signal means for providing timing signals; a first gate having an input connected to said timing signal means, an output connected to said first recording head and conduction control means, said first gate being adapted to maintain under the control of said conduction control means one of an open condition in which said gate conducts a signal from the input to the output thereof and a closed condition in which said gate blocks a signal; a second gate having an input connected to said timing signal means, an output connected to said second recording head and conduction control means, said second gate being adapted to maintain under the control of said conduction control means one of an open condition in which said gate conducts a signal from the input to the output thereof and a closed condition in which said gate blocks a signal; data input means for providing data signals; transfer control means connected between said data input means and the conduction control means of each of said first and second gates for controlling the condition of each of said first and second gates in accordance with said data signals, said transfer control means comprising a bistable multivibrator having a first input connected to said data input means, a first output connected to the conduction control means of said first gate, a second output connected to the conduction control means of said second gate so that each data signal provided by said data input means puts said first gate in its open condition thereby to conduct a timing signal to said first recording head and puts said second gate in its closed condition thereby to block a timing signal from said second recording head and when no data signal is provided by said data input means said first gate is put in its closed condition thereby to block a timing signal from said first recording head and puts said second gate in its open condition thereby to conduct a timing signal to said second recording head, and a second input connected to said timing signal means through time delay means so that said bistable multivibrator switches its stable state under the control of a timing signal after said first recording head receives a timing signal; and spacing means for preventing the operation of said first and second gates comprising a third gate interposed between said timing signal means and the inputs of said first and second gates, said third gate having an input connected to said timing signal means, an output connected to the inputs of said first and second gates and conduction control means, and first counter means having an input connected to the output of said third gate and an output connected to the conduction control means of said third gate, said first counter means being adapted to produce an output signal at intervals of a predetermined number of timing signals so that said first counter means puts said third gate in its closed condition thereby to block a timing signal from said first and second gates at said intervals.

6. Apparatus for recording data on a magnetic recording medium in a form adapted for checking comprising, in combination, a pair of signal gates, the output of each signal gate being applied to a different magnetic recording head associated with the medium; a third gate; a source of timing signals applied under control of the third gate to both signal gates; means providing data input signals; a bistable device switchable to one stable state by each data input signal; and means operative to switch the bistable device to the other stable state after the occurrence of each data input signal, the pair of signal gates being controlled by the bistable device so that one signal gate is operative when the device is in one state and the other signal gate is operative when the device is in the other state.

7. Apparatus for recording data on a magnetic recording medium in a form adapted for checking comprising, in combination, a pair of signal gates, the output of each signal gate being applied to a different magnetic recording head associated with the medium; a third gate; a source of timing signals applied under control of the third gate to both the signal gates; means providing data input signals; a bistable device switchable to one stable state by each data input signal; means operative to switch the bistable device to the other stable state after the occurrence of each data input signal, the pair of signal gates being controlled by the bistable device so that one signal gate is operative when the device is in one state and the other signal gate is operative when the device is in the other state; a counter; means to apply timing signals from the source to operate the counter; means to derive from the counter a control signal having a first value when the counter registers a predetermined count and a second value when the counter registers any count other than said predetermined count; and means for applying the control signal to the third gate to cause timing signals from the source to be applied to the signal gates when the control signal has a second value and to render the third gate inoperative to pass timing signals when the control signal has the first value.

8. Apparatus for recording data on a recording medium in a form adapted for checking comprising, in combination, a first recording head positioned in operative proximity with said recording medium; a second recording head positioned in operative proximity with said recording medium in spaced relation to said first recording head; timing signal means for providing timing signals; a first gate having an input connected to said timing signal means, an output connected to said first recording head and conduction control means, said first gate being adapted to maintain under the control of said conduction control means one of an open condition in which said gate conducts a signal from the input to the output thereof and a closed condition in which said gate blocks a signal; a second gate having an input connected to said timing signal means, an output connected to said second recording head and conduction control means, said second gate being adapted to maintain under the control of said conduction control means one of an open condition in which said gate conducts a signal from the input to the output thereof and a closed condition in which said gate blocks a signal; data input means for providing data signals; transfer control means connected between said data input means and the conduction control means of each of said first and second gates for controlling the condition of each of said first and second gates in accordance with said data signals, said transfer control means comprising a bistable multivibrator having a first input connected to said data input means, a first output connected to the conduction control means of said first gate, a second output connected to the conduction control means of said second gate so that each data signal provided by said data input means puts said first gate in its open condition thereby to conduct a timing signal to said first recording head and puts said second gate in its closed condition thereby to block a timing signal from said second recording head and when no data signal is provided by said data input means said first gate is put in its closed condition thereby to block a timing signal from said first recording head and puts said second gate in its open condition thereby to conduct a timing signal to said second recording head, and a second input connected to said timing signal means through time delay means so that said bistable multivibrator switches its stable state under the control of a timing signal after said first recording head receives a timing signal; spacing means for preventing the operation of said first and second gates comprising a third gate interposed between said timing signal means and the inputs of said first and second gates, said third gate having an input connected to said timing signal means, an output connected to the inputs of said first and second gates and conduction control means, and first counter means having an input connected to the output of said third gate and an output connected to the conduction control means of said third gate, said first counter means being adapted to produce an output signal at intervals of a predetermined number of timing signals so that said first counter means puts said third gate in its closed condition thereby to block a timing signal from said first and second gates at said intervals; a third recording head positioned in operative proximity with said recording medium in spaced relation to said first and second recording heads; and marking means for marking said recording medium at intervals of a predetermined number of recorded signals, said marking means comprising second counter means having an input connected to the output of said third gate and an output connected to said third recording head through time delay means, said second counter means being adapted to produce an output signal at intervals of a determined number of timing signals corresponding to a predetermined number of recorded signals.

9. Apparatus for checking the accuracy of reproduction of data represented by data signals recorded on a record medium, said data being recorded in a code form in a first channel of said record medium and in a complementary code form in a second channel of said record medium, said apparatus comprising, in combination, first signal sensing means positioned in operative proximity with the first channel of said record medium for providing electrical signals corresponding in number and position to said first channel recorded data signals; second signal sensing means positioned in operative proximity with the second channel of said record medium for providing electrical signals corresponding in number and position to said second channel recorded data signals; comparing means connected to said first and second signal sensing means for comparing at each interval in which a data signal is recorded on said record medium the electrical signals provided by said first signal sensing means with the electrical signals provided by said second signal sensing means, said comparing means being adapted to provide an error signal upon the occurrence of a recorded data signal in each of the first and second channels of said record medium in any recorded data signal interval and comprising gate means having an input connected to one of said first and second signal sensing means, an output and conduction control means connected to the other of said first and second signal sensing means, said gate means being adapted to maintain one of an open condition in which said gate means conducts a signal from the input to the output thereof when a signal is applied to each of said input and the conduction control means thereof and a closed condition in which said gate means blocks a signal to the output thereof when a signal is applied to only one of said input and said conduction control means; and counting means connected to said first and second signal sensing means for counting the electrical signals provided by said first and second signal sensing means, said counting means being adapted to provide an error signal upon the occurrence of a number of said electrical signals greater than a predetermined number.

10. Apparatus for checking the accuracy of reproduction of data represented by data signals recorded on a record medium, said data being recorded in a plurality of pairs of substantially parallel channels, each of said pairs of channels comprising a first channel having data recorded therein in a code form and a second channel having data recorded therein in a complementary code form, said apparatus comprising, in combination, first signal sensing means positioned in operative proximity with the first channel of each of said pairs of channels of said record medium for providing electrical signals corresponding in number and position to said first channel recorded data signals; second signal sensing means positioned in operative proximity with the second channel of each of said pairs of channels of said record medium for providing electrical signals corresponding in number and position to said second channel recorded data signals; comparing means connected to the first and second signal sensing means of each of said pairs of channels for comparing at each interval in which a data signal is recorded on said record medium the electrical signals provided by said first signal sensing means with the electrical signals provided by said second signal sensing means, said comparing means being adapted to provide an error signal upon the occurrence of a recorded data signal in each of the first and second channels of a pair of channels in any recorded data signal interval, each of said comparing means comprising gate means having an input connected to one of said first and second signal sensing means, an output and conduction control means connected to the other of said first and second signal sensing means, said gate means being adapted to maintain one of an open condition in which said gate means conducts a signal from the input to the output thereof when a signal is applied to each of said input and the conduction control means thereof and a closed condition in which said gate means blocks a signal to the output thereof when a signal is applied to only one of said input and said conduction control means; and counting means connected to the first and second signal sensing means of said pairs of channels for counting the electrical signals provided by said first and second signal sensing means, the electrical signals of said pairs of channels being sequentially supplied to said counting means, said counting means being adapted to provide an error signal upon the occurrence of a number of said electrical signals greater than a predetermined number.

References Cited by the Examiner

UNITED STATES PATENTS 2,813,259 11/1957 Burkhart ---------- 340—174.1

BERNARD KONICK, *Primary Examiner.*

IRVING SRAGOW, *Examiner.*

A. I. NEUSTADT, R. M. JENNINGS, *Assistant Examiners.*